W. MINNIEAR.
HAY RETAINER.
APPLICATION FILED MAR. 16, 1912.
1,045,426.
Patented Nov. 26, 1912.
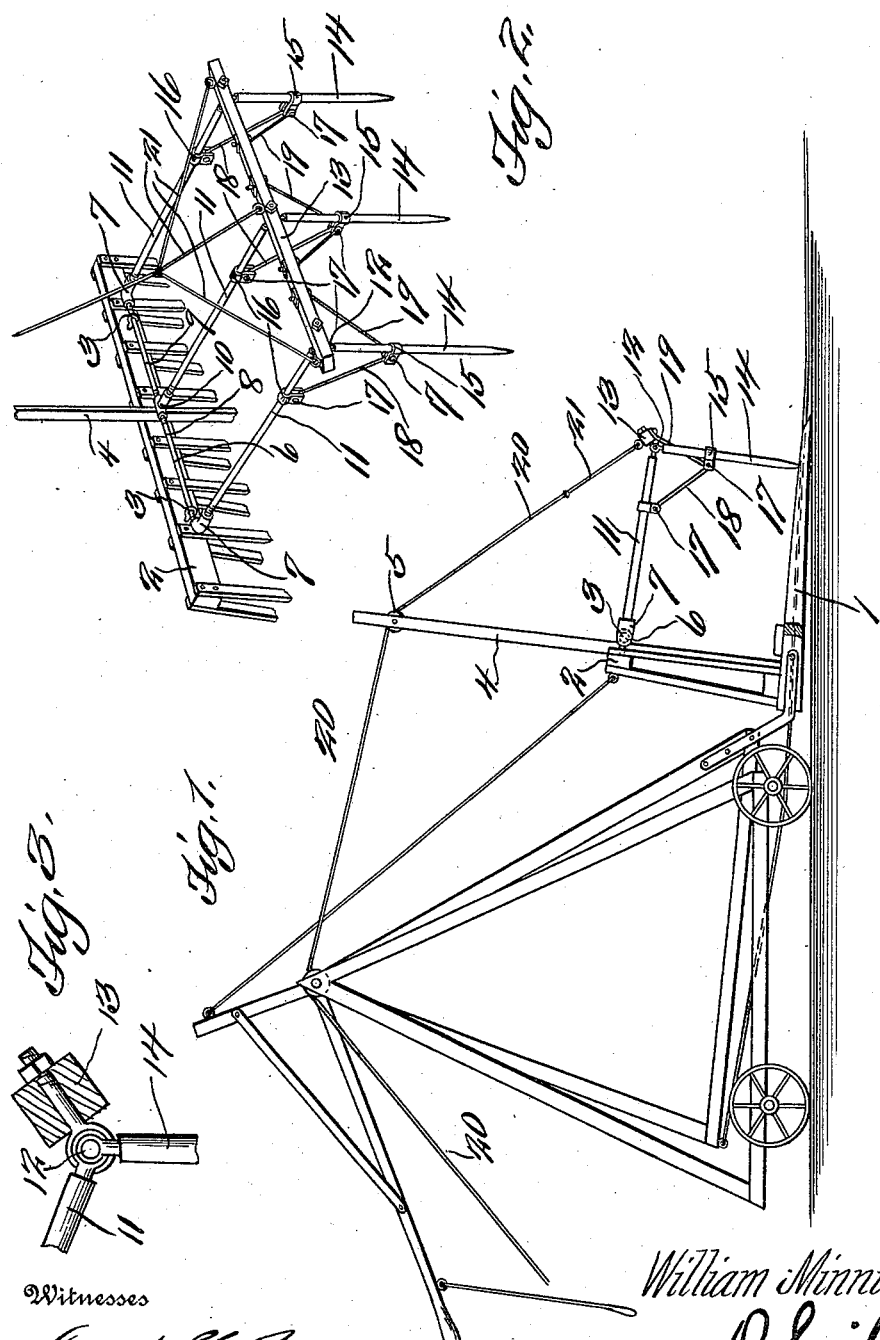
Witnesses
Francis T. Boswell
C. E. Clements
Inventor
William Minniear,
By D. Swift & Co.
Attorneys

UNITED STATES PATENT OFFICE.

WILLIAM MINNIEAR, OF ALTAMONT, KANSAS.

HAY-RETAINER.

1,045,426.  Specification of Letters Patent.  Patented Nov. 26, 1912.

Application filed March 16, 1912. Serial No. 684,291.

*To all whom it may concern:*

Be it known that I, WILLIAM MINNIEAR, a citizen of the United States, residing at Altamont, in the county of Labette and State of Kansas, have invented a new and useful Hay-Retainer; and I do hereby declare the following to be a full, clear, and exact description of the invention, such as will enable others skilled in the art to which it appertains to make and use the same.

This invention belongs to the art of haystackers, and it particularly relates to a new and useful hay retaining device for the rake of the stacker.

The primary object of the invention is to provide a hay retaining device including essential, practical and desirable features of construction.

The important features of the construction is the arrangement and connections of the teeth of the hay retainer, said connections being so constructed as to permit the teeth to be slightly adjusted, in order to more efficiently retain the hay upon the rake.

The invention comprises further and combination of parts, as hereinafter set forth, shown in the drawings and claimed.

In the drawings:—Figure 1 is a view in side elevation of a portion of a hay stacker, showing the rake, with the improved hay retainer as applied thereto. Fig. 2 is an enlarged detail perspective view of the retainer. Fig. 3 is a detail view partly in section, showing the joint between one of the rods 11, the beam 13, and the teeth 14.

Referring to the drawings 1 designates the rake or fork of the usual construction having a top bar 2 which is provided with a plurality of eyes 3, and projecting upwardly from the rake or fork is a vertically disposed standard 4, in which is journaled a pulley 5.

Mounted in the eyes 3 is a tubular rod 6, to the ends of which elbows 7 are threaded. The tubular rod 6 consists of two parts 8 and 9, connected together by a T-union 10. Threaded in the elbows and the T-union are the tubular rods 11, the outer ends of which are hingedly connected as at 12 to the bar or beam 13. Also connected to the hinge connections 12 are the upper ends of the teeth 14, there being three shown, but it is to be understood that the number of teeth may be increased or decreased, as desired. Adjustably fixed to the teeth are the split collars 15, while upon the tubular rods 11 similar collars 16 are adjustably arranged. Connecting the collars 15 and 16, by virtue of the bolts 17, are the brace rods 18, which are arranged angularly with respect to the tubular rods 11 and teeth 14. Connecting between the collars 15 and the bar or beam 13 are the brace rods 19.

A chain or cable 20 is provided, and is adapted to pass over the pulley 5, and terminates in a proper location adjacent the operator, who sits upon the forward portion (not shown) of the hay stacking machine. This chain or cable 20 is provided with three connections 21 to the bar or beam 13.

When stacking hay, the rake or fork is lowered as shown in Fig. 1, with the hay retainer elevated upon its pivot. The hay is then swept by means of a sweep (not shown) upon the rake or fork, after which the hay retaining device is lowered, so that the teeth will penetrate portions of the hay, and thereby retain the same on the rake or fork. The rake or fork is then elevated to the desired height, after which the rake or fork and the hay retaining device are oscillated on their pivots simultaneously, one lowering, while the other raises, thereby depositing the hay upon the stack, or on a wagon.

The invention having been set forth, what is claimed as new and useful is:—

1. In a hay retaining device for a hay stacker, a fork having an upper bar provided with a plurality of eyes, a hay retaining device fulcrumed in the eyes, and comprising tubular rods, a bar hingedly connected to the outer ends of the tubular rods, a plurality of teeth hingedly connected to the hinge connections between the tubular rods and the bar, and adjustable braces between the teeth and the tubular rods.

2. In combination, a fork having a top bar provided with a plurality of eyes, a hay retaining device fulcrumed in the eyes, the hay retaining device comprising a plurality of tubular rods, a beam hingedly connected to the outer ends of the tubular rods, teeth hingedly connected to the hinge connection between the beam and the tubular rods, adjustable split collars mounted on the teeth and the tubular rods, and braces connecting the collars.

3. In combination, a fork having an upper bar provided with eyes, a tubular rod mounted in the eyes and comprising two sections, a T-union connecting the two sections, each section having an elbow at its outer end, tubular rods, one being connected to the T-union, while the others are connected to the elbow, a beam hingedly connected to the outer ends of the last tubular rods, a plurality of teeth hingedly connected to the connections between the beam and the tubular rods, adjustable split collars carried by the teeth and the last named tubular rods, braces connecting the collars of the teeth and the last named tubular rods, and braces connecting the collars of the teeth and the beam.

In testimony whereof I have signed my name to this specification in the presence of two subscribing witnesses.

WILLIAM MINNIEAR.

Witnesses:
 DE WITT R. McCLELLAND,
 GEO. RAY.

Copies of this patent may be obtained for five cents each, by addressing the "Commissioner of Patents, Washington, D. C."